US012759042B2

(12) United States Patent
Thuo et al.

(10) Patent No.: US 12,759,042 B2
(45) Date of Patent: Oct. 13, 2026

(54) MICRO-CAPSULES HAVING AN AMORPHOUS SOLID CORE

(71) Applicant: The Indium Corporation of America, Clinton, NY (US)

(72) Inventors: Martin Thuo, Apex, NC (US); Ian Tevis, New Hartford, NY (US)

(73) Assignee: THE INDIUM CORPORATION OF AMERICA, Clinton, NY (US)

( * ) Notice: Subject to any disclaimer, the term of this patent is extended or adjusted under 35 U.S.C. 154(b) by 0 days.

(21) Appl. No.: 18/452,441

(22) Filed: Aug. 18, 2023

(65) Prior Publication Data

US 2024/0058861 A1 Feb. 22, 2024

Related U.S. Application Data

(60) Provisional application No. 63/371,994, filed on Aug. 19, 2022.

(51) Int. Cl.

| | |
|---|---|
| ***B22F 1/08*** | (2022.01) |
| ***B22F 1/102*** | (2022.01) |
| ***B22F 1/16*** | (2022.01) |
| ***B22F 1/17*** | (2022.01) |
| ***B23K 35/02*** | (2006.01) |

(52) U.S. Cl.

CPC .................. *B22F 1/16* (2022.01); *B22F 1/08* (2022.01); *B22F 1/102* (2022.01); *B22F 1/17* (2022.01); *B23K 35/025* (2013.01)

(58) Field of Classification Search

CPC ................. B22F 1/16; B22F 1/17; B22F 1/08

USPC .......................................................... 428/570

See application file for complete search history.

(56) References Cited

U.S. PATENT DOCUMENTS

| | | | |
|---|---|---|---|
| 4,042,374 A | 8/1977 | Rasmussen et al. | |
| 6,416,590 B1 | 7/2002 | Hirata et al. | |
| 11,174,701 B2 | 11/2021 | Pearl, Jr. et al. | |
| 11,673,190 B2 | 6/2023 | Thuo et al. | |
| 2003/0177865 A1 | 9/2003 | Ono et al. | |
| 2004/0096688 A1 | 5/2004 | Tadauchi et al. | |
| 2014/0090752 A1* | 4/2014 | Waniuk | C22C 1/11 148/403 |
| 2016/0317992 A1 | 11/2016 | Thuo et al. | |

(Continued)

FOREIGN PATENT DOCUMENTS

| | | |
|---|---|---|
| CN | 109482859 | 3/2019 |
| EP | 3142124 | 3/2017 |
| JP | 2018-529018 A | 10/2018 |

OTHER PUBLICATIONS

Tevis et al., "Synthesis of Liquid core-Shell Particles and Solid Patchy Multicomponent Particles by Shearing Liquids Into Complex Particles (SLICE)," Langmuir, vol. 30, No. 47, Nov. 18, 2014, pp. 14308-14313.

(Continued)

*Primary Examiner* — Katherine A Christy

(74) *Attorney, Agent, or Firm* — Sheppard, Mullin, Richter & Hampton LLP

(57) ABSTRACT

A particle comprises an amorphous solid metallic core enclosed within a metal-oxide shell. The amorphous solid metallic core includes one or more metals and is below a glass transition temperature of the one or more metals. The particle further comprises one or more regions having a crystalline or semi-crystalline structure disposed within the amorphous solid metallic core.

18 Claims, 9 Drawing Sheets

(56) References Cited

U.S. PATENT DOCUMENTS

| | | | |
|---|---|---|---|
| 2017/0014958 | A1 | 1/2017 | Thuo et al. |
| 2017/0197250 | A1 | 7/2017 | Oh et al. |
| 2017/0326523 | A1 | 11/2017 | Thuo et al. |
| 2019/0203327 | A1 | 7/2019 | Thuo et al. |
| 2020/0146142 | A1 | 5/2020 | Thrasher et al. |
| 2022/0023940 | A1 | 1/2022 | Thuo et al. |
| 2023/0182236 | A1 | 6/2023 | Thuo et al. |

OTHER PUBLICATIONS

Extended European Search Report dated Oct. 30, 2024 for European Application No. EP21916393.8.

Examination Report—Communication pursuant to Article 94(3) EPC dated Jan. 5, 2026 for European Application No. 21916393.8.

Cutinho et al., "Autonomous thermal-oxidative composition inversion and texture tuning of liquid metal surfaces," ACS nano 12.5 (2018): 4744-4753.

* cited by examiner

700

| Type | Less than 0.5% larger than | 10% Max. between | 80% Min. Between | 10% Max. Less than |
|---|---|---|---|---|
| 1 | 160 | 150-160 | 75-150 | 75 |
| 2 | 80 | 75-80 | 45-75 | 45 |
| 3 | 60 | 45-60 | 25-45 | 25 |
| 4 | 50 | 38-50 | 20-38 | 20 |
| 5 | 40 | 25-40 | 15-25 | 15 |
| 6 | 25 | 15-25 | 5-15 | 5 |
| 7 | 15 | 11-15 | 2-11 | 2 |

FIG. 7

MICRO-CAPSULES HAVING AN AMORPHOUS SOLID CORE

CROSS-REFERENCE TO RELATED APPLICATION

This application claims priority to U.S. Provisional Patent Application No. 63/371,994, filed on Aug. 19, 2022, entitled "METHODS AND APPARATUSES FOR SUPER-COOLED MICRO-CAPSULES" which is hereby incorporated by reference in its entirety.

TECHNICAL FIELD

The present disclosure relates generally to metals and more particularly, although not necessarily exclusively, to amorphous solid and supercooled liquid metals that are enclosed in shells.

BACKGROUND

Metals, including metal alloys, can be useful in myriad applications. In some applications one or more metals may be combined into an alloy that is used to solder or braze two components together, for example in an electronic assembly. Electronic assemblies may have one or more components that are sensitive to elevated temperatures and may not be able to endure the temperature required for the soldering and/or brazing operation. New methods and/or materials are needed to perform soldering and/or brazing operations at reduced temperatures.

SUMMARY

In some embodiments a particle comprises an amorphous solid metallic core enclosed within a metal-oxide shell. In various embodiments the amorphous solid metallic core includes one or more metals and is below a glass transition temperature of the one or more metals. In some embodiments the particle further comprises one or more regions having a crystalline or semi-crystalline structure disposed within the amorphous solid metallic core. In various embodiments the amorphous solid metallic core includes tin, silver and copper.

In some embodiments the amorphous solid metallic core further includes at least one additional element. In various embodiments the amorphous solid metallic core further includes at least one of phosphorous, vanadium, silicon or bismuth. In some embodiments the amorphous solid metallic core includes tin and bismuth. In various embodiments the amorphous solid metallic core further includes at least one additional element. In some embodiments the amorphous solid metallic core further includes at least one of phosphorous, vanadium or silicon.

In some embodiments the metal-oxide shell includes one or more layers. In various embodiments the metal-oxide shell includes an outer metal-oxide layer and an inner metal layer. In some embodiments the particle further comprises an organic coating on an exterior surface of the shell.

In some embodiments a droplet comprises a metal alloy core in an amorphous solid state and a shell fully enclosing the metal alloy core and including at least one metal-oxide layer. In various embodiments the droplet further comprises one or more regions having a crystalline or semi-crystalline structure disposed within the metal alloy core. In some embodiments the metal alloy core includes tin, silver and copper. In various embodiments the metal alloy core further includes at least one of phosphorous, vanadium, silicon or bismuth. In some embodiments the metal alloy core includes tin and bismuth. In some embodiments the metal alloy core further includes at least one of phosphorous, vanadium or silicon. In various embodiments a method of making a droplet comprises forming a metal core, forming a shell around the metal core, and transitioning the metal core to an amorphous solid state. In some embodiments the method further comprises forming one or more regions within the metal core that have a crystalline or semi-crystalline structure.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 7 is a table that illustrates solder paste type categories with the size ranges of the solder particles expressed in microns.

DETAILED DESCRIPTION

Figure 1A:
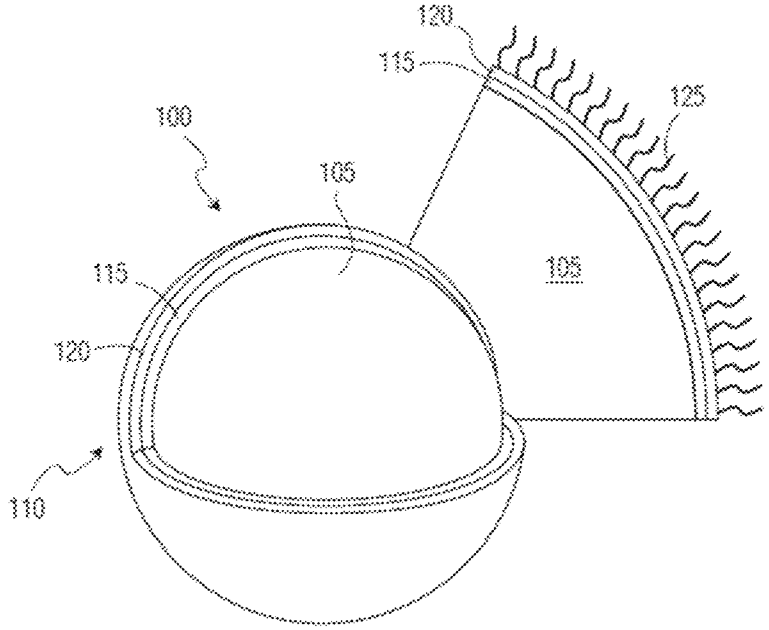
FIG. 1A is a diagram depicting a simplified partial cross-sectional view of a supercooled micro-capsule having a supercooled liquid metallic core enclosed by a metal shell, according to embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some embodiments of the present disclosure relate to micro-capsules that include a core formed from one or more metals that are in an amorphous solid state and a metal-oxide shell that surrounds the core. In one example micro-capsules can be formed that include supercooled liquid cores surrounded by a metal-oxide shell. The micro-capsules can then be cooled such that the core transitions from a supercooled liquid state to an amorphous solid state. While in an amorphous solid state the stability of the micro-capsules may be improved as compared to the supercooled liquid state, which may result in a reduced number of the micro-capsules spontaneously transitioning to a solid crystalline state.

In some embodiments the micro-capsules with amorphous solid metal cores may be combined with metallic particulates and/or a flux vehicle. During heating the core of the amorphous micro-capsules may transition to supercooled liquid and the metallic particulates may transition to a molten liquid state. The flux may disassociate the shells of the micro-capsules enabling the supercooled liquid to diffuse with the molten metal to form a resulting alloy that may have a melting temperature above a melting temperature of the metallic particulates. In further embodiments the amorphous micro-capsules may be at least partially dissolved into the molten metal material while still in the amorphous glass state resulting in a bulk material with distributed amorphous regions. In yet further embodiments the shells of the amorphous micro-capsules may be removed while the cores are still in the amorphous solid state and the amorphous cores may be mechanically compressed together and/or onto a surface to form a bulk amorphous metal.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Supercooled Micro-Capsules

FIG. 1A is a diagram depicting a simplified partial cross-sectional view of a supercooled micro-capsule 100 having a supercooled liquid metallic core 105 enclosed by a metal oxide shell 110, according to embodiments of the disclosure. In some embodiments shell 110 can prevent liquid metallic core 105 from transitioning to a solid when supercooled micro-capsule 100 is exposed to temperatures below the solidus temperature of the alloy by providing an interior surface free from nucleation sites and/or by creating a "thermodynamic tension" that increases an energy threshold for liquid to solid phase transformation to occur. As depicted in FIG. 1, shell 110 includes two layers 115, 120 that can each have a different composition, however other embodiments may have fewer or additional layers. In some embodiments shell 110 can be made from one, two, three or more layers where each layer can be defined by a predominant concentration of a different element or chemical species. In some embodiments one or more layers are oxide layers and one or more layers are metal and/or metal alloy layers. In further embodiments, shell 110 can be terminated with a ligand 125 or other liquid. Supercooled micro-capsule 100 is described in greater detail in co-owned and co-pending U.S. application Ser. No. 17/383,150 filed on Jul. 22, 2021, which is incorporated by reference herein in its entirety for all purposes.

Amorphous Micro-Capsules

Figure 1B:
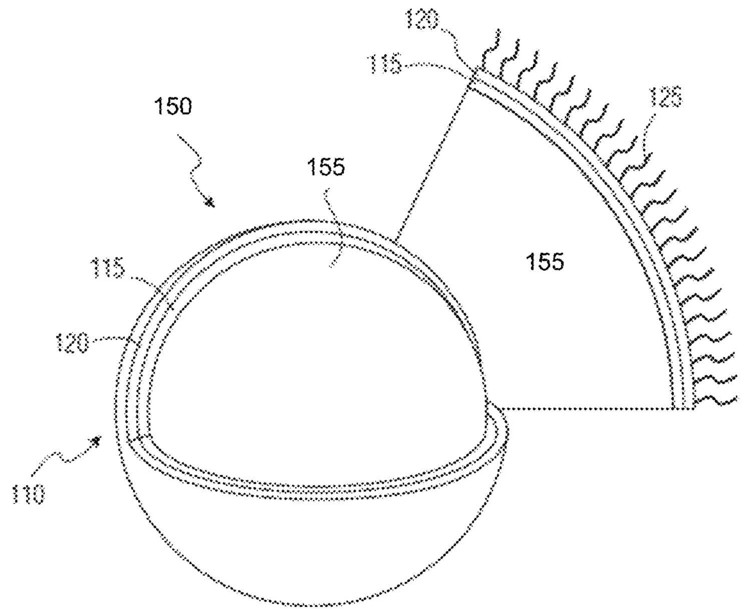
FIG. 1B is a diagram depicting a simplified partial cross-sectional view of a micro-capsule having an amorphous solid metallic core enclosed by a metal shell, according to embodiments of the disclosure.

As shown in FIG. 1B, and as described in more detail below, super cooled micro-capsule 100 (shown in FIG. 1A) can be cooled below a glass transition temperature of the liquid metallic core 105 to transition the liquid metallic core to an amorphous solid metallic state forming an amorphous solid metallic core 155. As defined herein, an amorphous solid metallic state is a state in which the core 155 is completely, or at least partially, non-crystalline. Shell 110 may prevent, or delay, transition of amorphous solid metallic core 155 to a crystalline solid state when amorphous micro-capsule 150 is exposed to temperatures above a glass-transition temperature of core 155.

In some embodiments amorphous solid metallic core 155 is completely amorphous without crystalline structure. In further embodiments amorphous solid metallic core 155 is at least partially amorphous with distributed regions having crystalline or semi-crystalline structure distributed within the amorphous bulk core. Such a structure may also be described as an amorphous core having short range ordering (e.g., relatively small regions of crystalline or semi-crystalline structure). In some embodiments the size (e.g., mean diameter) of the crystalline or semi-crystalline regions may each be less than 10 nanometers, less than 20 nanometers, less than 50 nanometers, less than 100 nanometers, less than 250 nanometers, less than 500 nanometers, less than 750 nanometers or less than 1000 nanometers.

In some embodiments amorphous micro-capsules 155 may be more stable than supercooled micro-capsules 100 such that the amorphous micro-capsules may be less likely to transition to a solid crystalline state as compared to supercooled micro-capsules. In particular the low atomic mobility of the glass state as compared to the liquid state may improve the stability of the cores, reducing the propensity to spontaneously transition to a solid state. The improved stability may result in improved reliability, shelf-life and consistency in performance if the micro-capsules. In some embodiments amorphous micro-capsules 155 are stored at a temperature below a glass transition temperature of amorphous solid metallic core 155. In various embodiments amorphous micro-capsules 155 may be employed while the core is in an amorphous solid state while in other embodiments, they may be employed by first transitioning the core to a supercooled liquid state, as explained in more detail below. In some embodiments amorphous micro-capsules 155 may be transitioned between temperatures that cause the core to transition reversibly between an amorphous solid state and a supercooled liquid state. Shell 110 may prevent the transition of the core to a solid crystalline phase during the temperature changes. One of skill in the art having the benefit of this disclosure will appreciate the myriad ways in which these micro-capsules can be employed. Several examples are described in more detail below, however this disclosure is not limited to these examples and other suitable methods of using the micro-capsules are within the scope of this disclosure.

Amorphous Micro-Capsules and Metallic Particles

Figure 2:
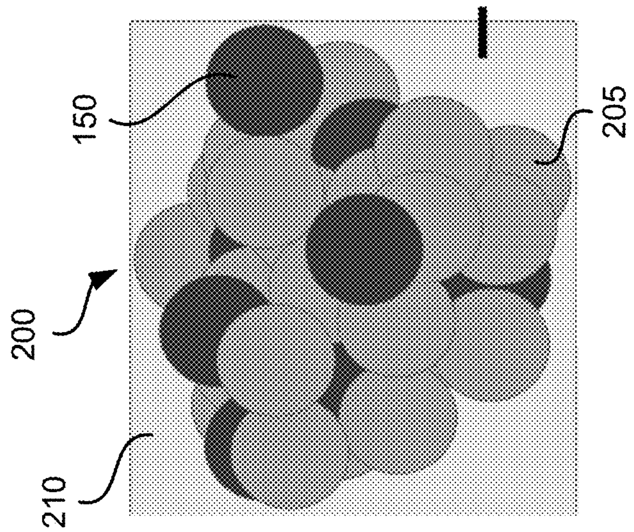
FIG. 2 is a diagram of a material that includes micro-capsules having amorphous solid metallic cores and metallic particulates, according to embodiments of the disclosure.

FIG. 2 is a simplified image illustrating the formation of a material (e.g., a solder paste) 200 including amorphous micro-capsules 150 having cores in an amorphous solid state combined with metal particles 205, according to embodiments of the disclosure. As shown in FIG. 2, amorphous micro-capsules 150 and metal particles 205 are dispersed within a flux 210 and/or ligand solution. In this particular embodiment, metal particles 205 can be in a solid phase at room temperature and may have a relatively low melting temperature, as described in more detail below. In other embodiments, metal particles 205 could also be supercooled liquid phase particles with a melting point below a melting point of amorphous micro-capsules 150. In some embodiments metal particles 205 may be made from a single metallic element while in other embodiments they may be made from one or more metallic and/or non-metallic elements. Methods of combining micro-capsules (which may be supercooled or in an amorphous solid state as described herein) with metallic particles are described in greater detail in co-owned and co-pending U.S. application Ser. No. 18/065,356 filed on Dec. 13, 2022, which is incorporated by reference herein in its entirety for all purposes.

In one embodiment, solder paste 200 is formed by mixing amorphous micro-capsules 150 and metal particles 205 with a flux paste vehicle. The solder paste 200 may be stored below room temperature and/or below a glass transition temperature of the amorphous solid core 155. The solder paste 200 may be heated during use which transitions the core from an amorphous solid state to a supercooled liquid state. When the mixture is heated above the melting temperature of metal particles 205, the metal particles transform to a liquid state. Further heating in the presence of the flux 210 and molten metal (e.g., melted metal particles 205) will dissolve the shell 110 (see FIGS. 1A, 1B) of supercooled micro-capsules 100, leaving the supercooled liquid core 105 encapsulated in flux 210 and/or molten metal at a temperature that may be below a solidus temperature of the resulting metal alloy. Flux 210 can also temporarily encapsulate the liquefied metal particles 205 until they coalesce with other liquefied metal particles or with other supercooled micro-capsules 100. Because both materials are in a liquid state they readily interdiffuse to create a new resulting alloy which is a combination of the composition of supercooled micro-capsules 100 and metal particles 205.

Liquefied metal particles 205 can function as a catalyst and can absorb supercooled micro-capsules 100 without transforming to a solid. If metal particles 205 are supercooled particles, the shell may be more dissolvable than the shells of micro-capsules 100, to facilitate the formation of the alloy. The new alloy solidifies when the composition reaches a composition (via the aforementioned interdiffusion process) and/or when the ambient temperature is lowered and nucleation is initiated. In various embodiments flux 210 can be selected to activate at a particular temperature range determined by the composition of amorphous micro-capsules 150 and metal particles 205. In some embodiments a melting temperature of the metal particles 205 is below a melting temperature of the shell of the supercooled micro-capsules and in various embodiments the melting temperature of the alloyed particles is below a melting temperature of the liquid core of the supercooled micro-capsules.

In some embodiments, the weight percent of amorphous micro-capsules 150 in the combination of amorphous micro-capsules and metal particles 205 can be between 1 to 99 weight percent, between 5 to 50 weight percent, between 8 to 20 weight percent and in one embodiment can be approximately 10 weight percent. In some embodiments metal particles 205 are lower in weight percent as compared to amorphous micro-capsules 150. In one embodiment, metal particles 205 are less than 50 weight percent, or less than 20 weight percent or between 1 weight percent and 20 weight percent of solder paste 200. In another embodiment the weight percent of metal particles is between 90 weight percent and 99.9 weight percent, while in another embodiment the weight percent of metal particles is between 95 weight percent and 99 weight percent.

In another embodiment the solder paste 200 is formed by mixing amorphous micro-capsules 150 and metal particles 205 with a flux paste vehicle, however, in this embodiment during the heating of the solder paste the core of the amorphous micro-capsules do not transition from an amorphous solid state to a supercooled liquid state. Instead, the cores remain in an amorphous solid state 155 and are combined with the molten metal (melted metal particles). The amorphous solid core 155 may dissolve at a faster rate than a comparable crystalline solid core of the same composition. In some embodiments the entirety of the amorphous solid metal core may be dissolved into the molten metal while in other embodiments only a portion of the amorphous solid metal core may be dissolved before the resulting alloy crystallizes, locking in amorphous regions distributed within a crystalline bulk. This structure may improve certain mechanical properties of the resulting alloy (e.g., tensile strength, elastic modulus, etc.) as the distributed amorphous regions may impede the movement of dislocations throughout the bulk material and reduce the grain boundary density in the amorphous regions.

Although these particular embodiments have been described with reference to a flux and for use as a solder material, this disclosure is not limited to these particular implementation features. The combination of amorphous micro-capsules and metallic particles may be used for any other suitable purpose, for example as a brazing material, as a method of forming metallic structures with unique micro-structures and/or metallic properties, with or without a flux vehicle. For example, in some embodiments a flux vehicle may not be employed and a combination of amorphous micro-capsules and metallic particles may be combined in a vacuum or inert atmosphere while in further embodiments a gaseous flux may be used. The combination of amorphous micro-capsules and metallic particles may be used to form a turbine fan blade, an engine connecting rod, a rocket nozzle or other metallic structure with unique physical properties.

Amorphous Micro-Capsules for Forming Bulk Material

In some embodiments a bulk material that can be used for example to create a metallic part, can be formed using amorphous micro-capsules 150 heated to a temperature that transitions the core from an amorphous solid state to a supercooled liquid state. While in the supercooled liquid state the shell may be removed and/or dissolved via a flux or other suitable method enabling the supercooled liquid cores to coalesce. The supercooled bulk material may then be cooled back down into an amorphous solid state at which time the metallic part can be formed.

In some embodiments cores of amorphous micro-capsules 150 may be maintained in an amorphous solid state at a temperature above or below the glass transition temperature of the core. While in the amorphous solid state the shells may be removed and/or dissolved via a flux or other suitable method enabling the amorphous solid state cores to coalesce into an amorphous solid state bulk material. In some embodiments after removal or dissolution of the shells the amorphous solid state cores may be mechanically compressed together into an amorphous bulk metallic material. Because the cores are amorphous solids they may coalesce into a homogeneous or monolithic amorphous bulk material. In further embodiments the amorphous solid cores may be mechanically pressed against a surface to join the cores to the surface to form a metallic part. In various embodiments the use of the removable shells described above may be employed to form amorphous solid particles of any suitable metal and/or combination of metals and non-metals. Because of the difficulty in forming amorphous solid metal materials the use of removable shells may enable the production of amorphous solid metals that cannot be cost-effectively produced via alternative processes.

Formation of Micro-Capsules Having Amorphous Solid Metallic Cores

Figure 3A:
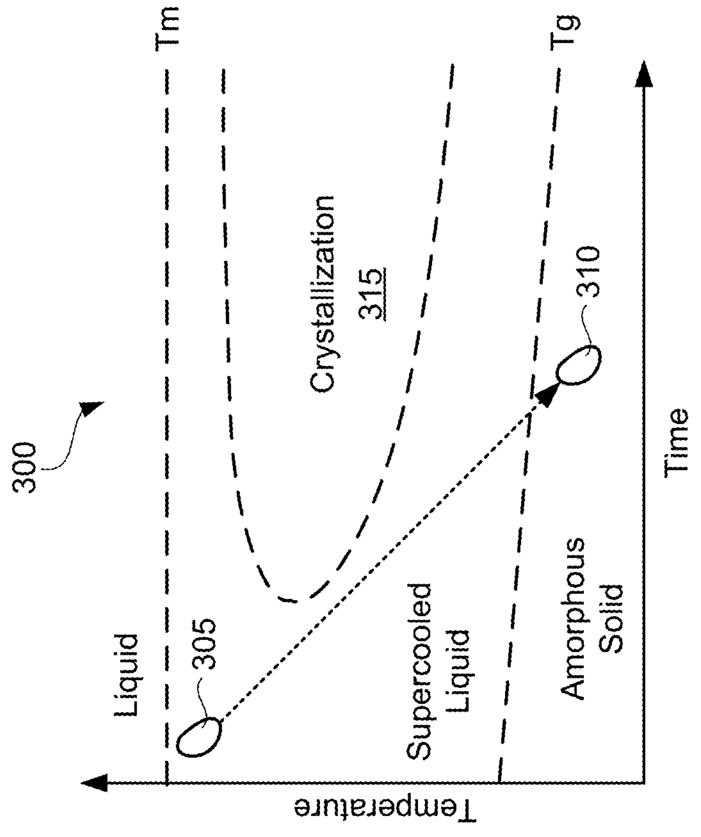
FIG. 3A is a temperature versus time phase diagram for a metal that transitions from a supercooled liquid to an amorphous solid, according to embodiments of the disclosure.

FIG. 3A shows an example phase diagram 300 for a metal that that transitions from a supercooled liquid state 305 to an amorphous solid state 310. As shown in FIG. 3A, the metal is at a supercooled liquid state 305 which is below the melting temperature (Tm), above the glass transition temperature (Tg) and before a time that crystallization occurs. In this embodiment the metal transitions to the amorphous solid state 310 at a rapid rate to avoid the crystallization phase 315.

Figure 3B:
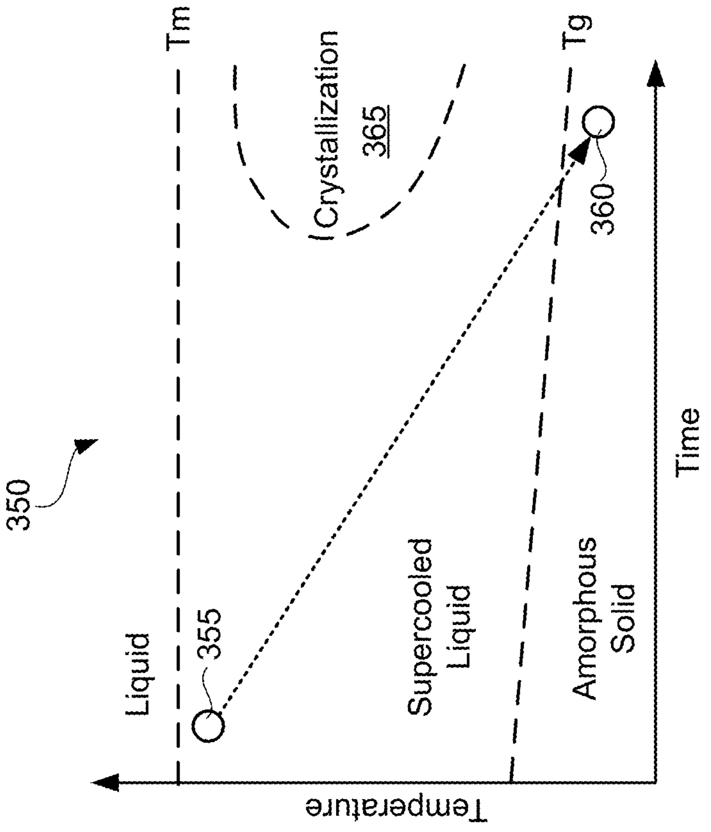
FIG. 3B is a temperature versus time phase diagram for a supercooled liquid micro-capsule that has a core that transitions from a supercooled liquid to an amorphous solid, according to embodiments of the disclosure.

FIG. 3B shows an example phase diagram 350 for a supercooled liquid particle (e.g., such as particle 100 shown in FIG. 1A) that has a shell and a core where the core transitions from a supercooled liquid state 355 to a metallic glass state 360. As shown in FIG. 3B, the cooling process can be performed at a slower rate than shown in FIG. 3A, as the shell of the particle delays the crystallization phase 365 from occurring. Thus, the shell improves not only the stability of the amorphous solid state core but also enables the transition from the supercooled liquid state to the amorphous solid state over a longer time period.

Figure 4A:
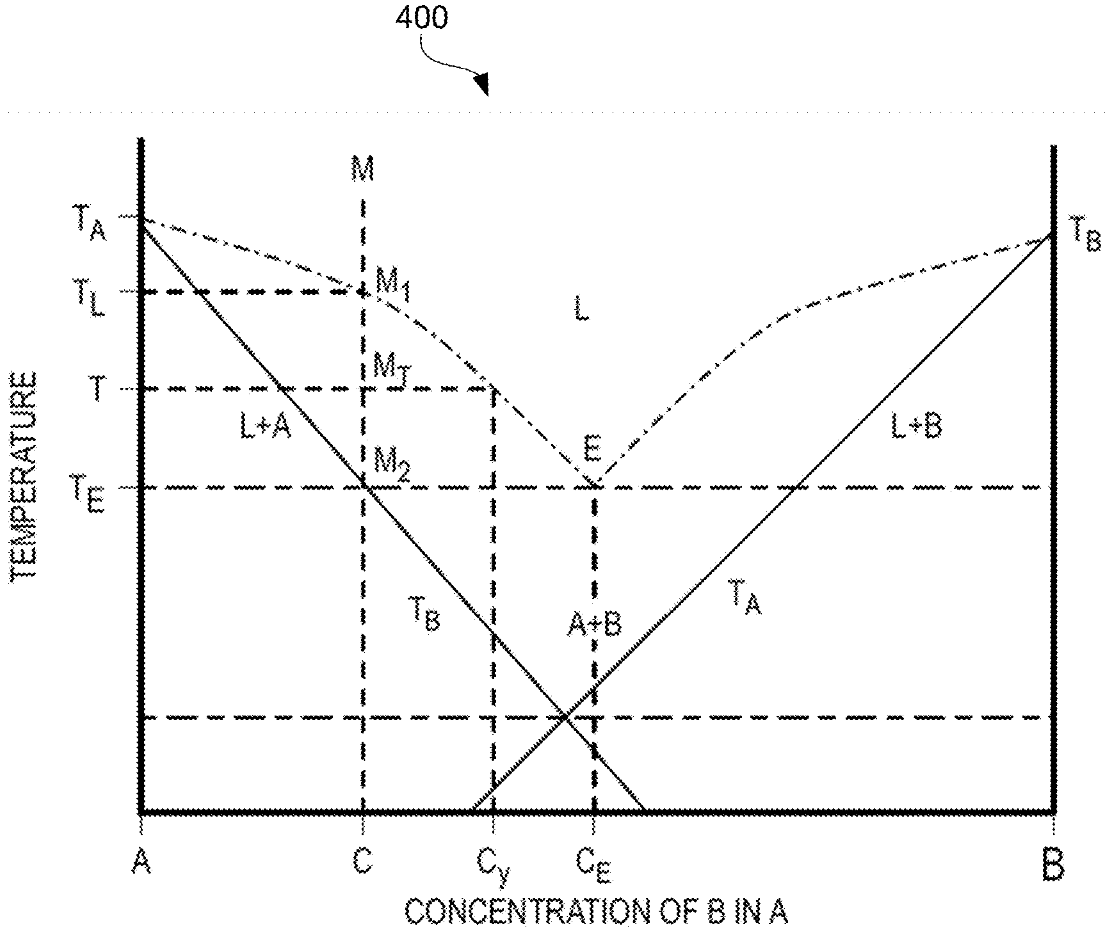
FIG. 4A is a temperature versus alloy composition phase diagram for forming a supercooled liquid and/or amorphous solid metal, according to embodiments of the disclosure.

FIG. 4A shows an example phase diagram 400 with associated $T_o$ which is the locus of the temperatures and compositions where the free energies of the two phases are equal. As shown in FIG. 4A, in some embodiments, the alloy composition and degree of supercooling may be designed such that solidification is either through partitioned or partition-less solidification. Supercooling to temperatures above or below the $T_o$ by coupled engineering of the shell and the size of the particles dictates the extent of supercooling relative to the $T_o$ curves. In some embodiments elements can be selected such that the $T_o$ curves do not meet at the working temperature causing the material within the joint to be highly viscous, and subject to surface driven solidification.

In some embodiments, where the $T_o$ lines to do meet ($T_b'$ or $T_a'$) below room temperature, the alloy composition is designed such that the supercooling leads to crossing either of the $T_o$ lines. To facilitate partition-less solidification and formation of a single-phase solidus, the alloys are hypercooled such that the supercooled temperature is below the $T_o$ but also low enough to overcome any temperature changes due to release of latent heat of fusion during solidification.

Figure 4B:
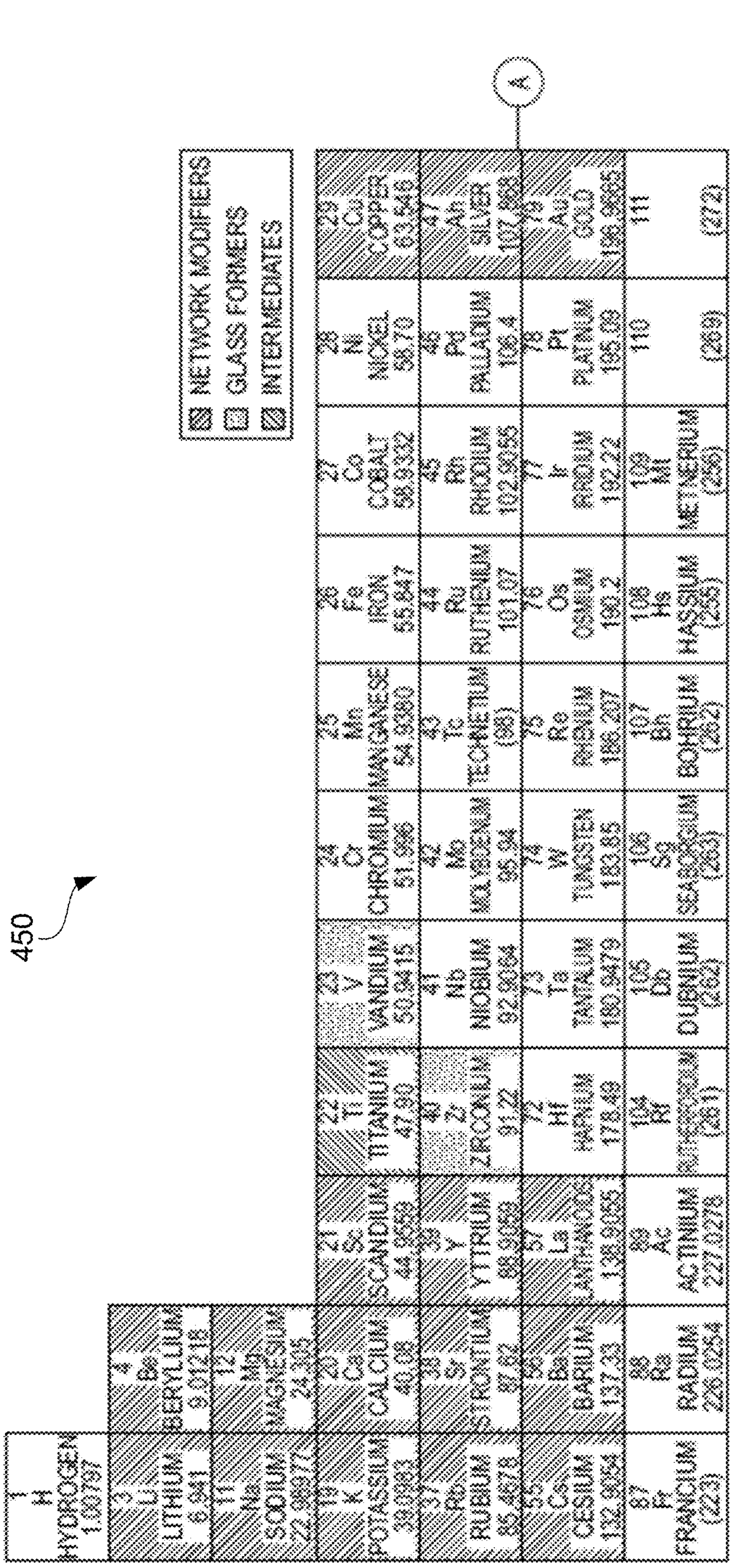
FIG. 4B is a periodic table highlighting elements that may function as network modifiers, glass formers, or intermediates to form amorphous solid metals, according to embodiments of the disclosure.
Figure 4B:
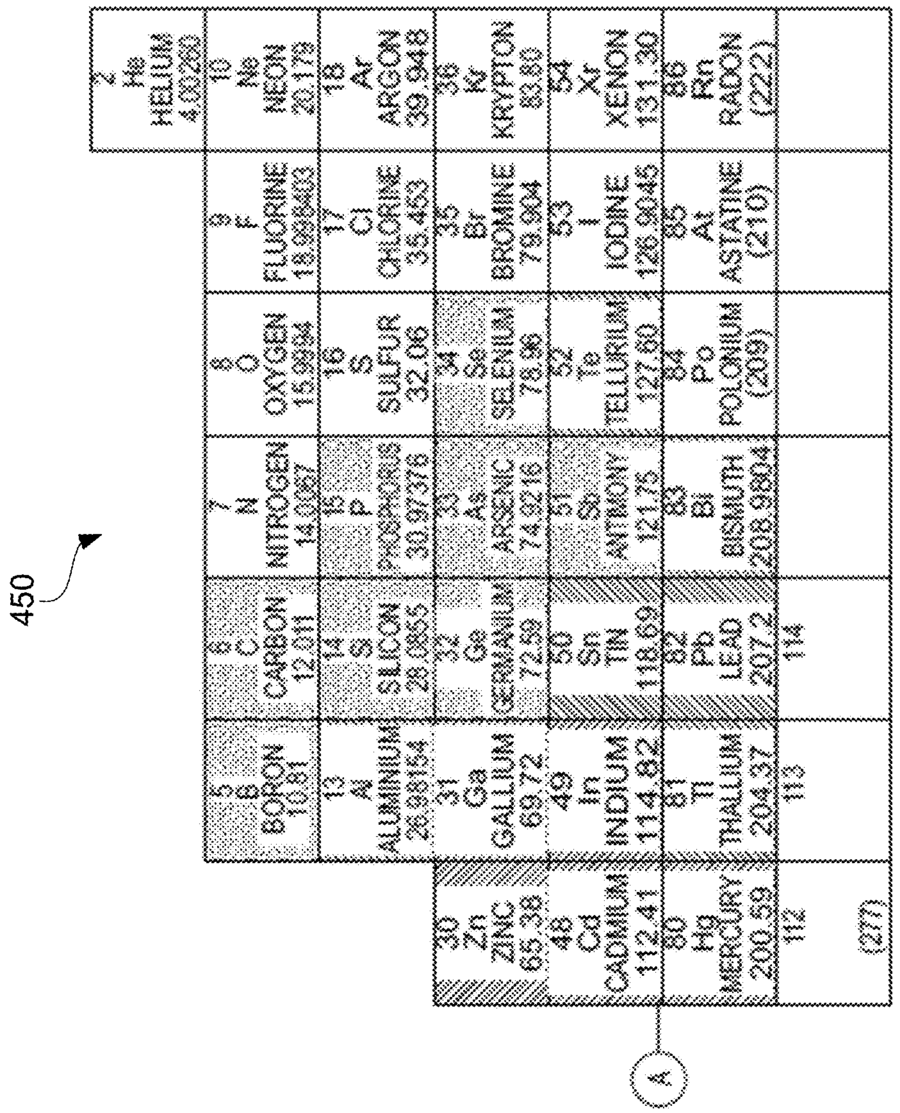

In some embodiments, the bulk liquid may be designed to be of increased fragility by adding one or more glass formers and/or network modifiers (see periodic table in FIG. 4B), such that diffusion is slow, resulting in a reduced rate of nucleant growth yielding increased grain sizes. The inverse would lead to smaller grains, a finer microstructure and mechanically stronger material. In some embodiments a metallic glass may be formed without adding one or more glass formers and/or network modifiers.

In various embodiments a metallic glass of the core bulk liquid can be formed from an alloy of tin, silver and copper. In some embodiments an additional metal or non-metal may be added. In various embodiments one or more glass formers, intermediates and/or network modifiers (see periodic table 450 in FIG. 4B), may be added. In some embodiments one or more of silicon, phosphorous, vanadium or bismuth may be added to the alloy of tin, silver and copper.

In various embodiments a metallic glass of the core bulk liquid can be formed from an alloy of tin and bismuth. In some embodiments an additional metal or non-metal may be added. In various embodiments one or more glass formers, intermediates and/or network modifiers (see periodic table in FIG. 4B), may be added. In some embodiments one or more of silicon, phosphorous or vanadium may be added to the alloy of tin and bismuth.

Figure 5:
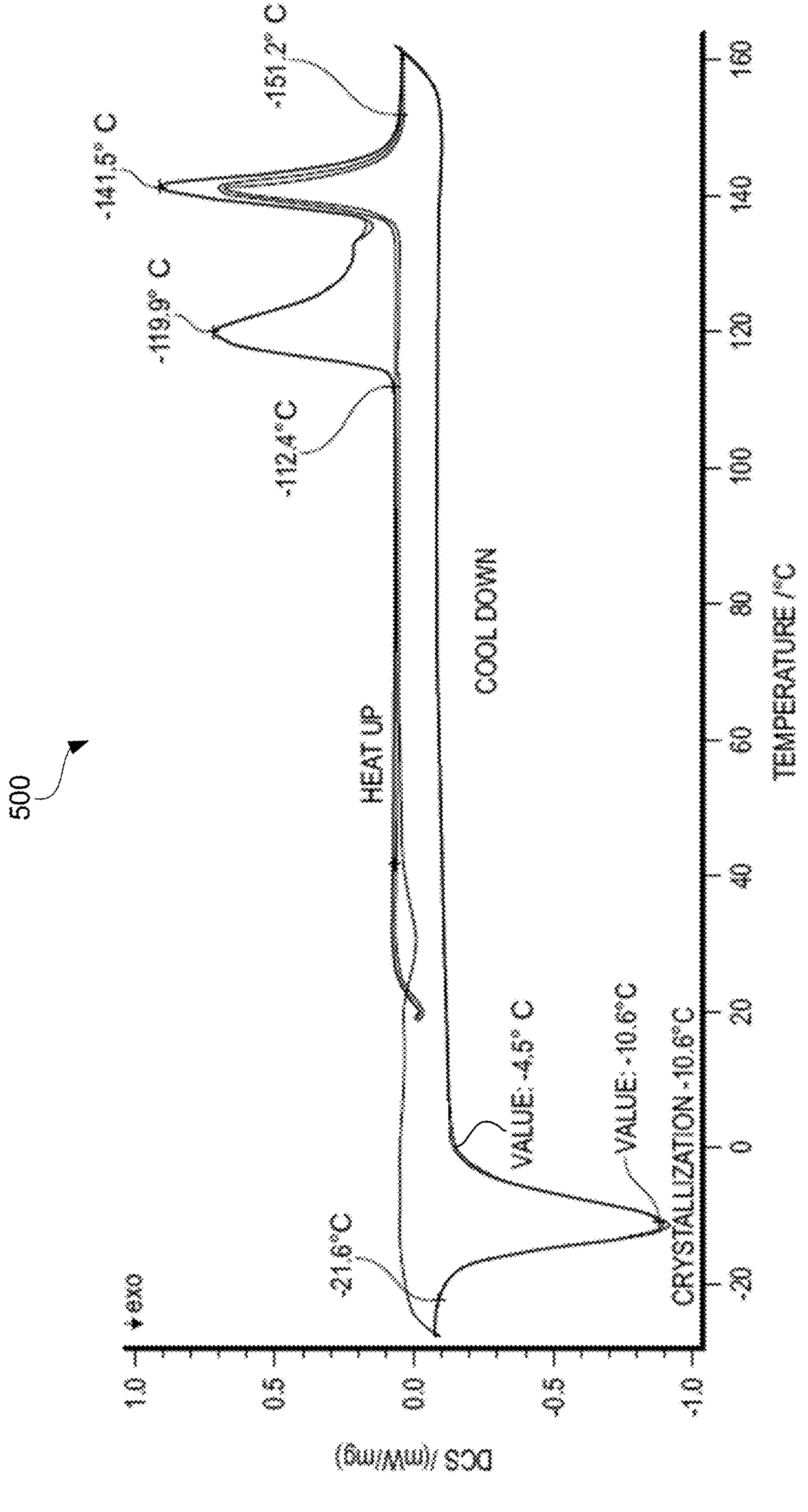
FIG. 5 is a differential scanning calorimetry (DSC) graph indicating a metastable crystal structure that can be formed in a supercooled micro-capsule, according to embodiments of the disclosure.

FIG. 5 illustrates a differential scanning calorimetry (DSC) graph 500 of a metastable crystal structure that can be formed in a supercooled micro-capsule, according to embodiments of the disclosure. As shown in FIG. 5 a material with metastable crystal structure is shown that melts at a lower temperature than the same material when it has formed a stable crystal structure. In the specific example shown in FIG. 5 the melting temperature for the material with its stable crystal structure is 141.5 C. In contrast, the same material when having a metastable crystal structure melts at 119.9 C. Thus, the metastable crystal structure melts at a temperature below the standard melting temperature of 141.5 C so the crystalline structure that melts at 119.9 C is less stable than the standard crystalline structure that melts at 141.5 C. The Tg maybe at approximately 35 C and the crystallization temperature may be at approximately −1 C.

Metastable crystal structures or higher energy polymorphs can be used within, the bulk, enriched regions of the bulk, or within the one or more layers of the shell of supercooled or amorphous solid micro-capsules. In some embodiments metastable clusters can be formed within the bulk of the supercooled or amorphous solid micro-capsule, which can frustrate crystallization by forming relatively high-energy structures. In one example gold prefers to form a fcc crystal structure, however it can be forced to form, for example the less ductile HCP crystalline structure within the bulk. Because the HCP crystalline structure is not gold's preferred lowest energy structure the HCP structure has a higher energy and therefore changes the dynamics of the joint that is formed by the supercooled micro-capsule. In some embodiments a metastable crystal structure can be used to mitigate electromigration effects by for example using elements like bismuth.

Figure 6:
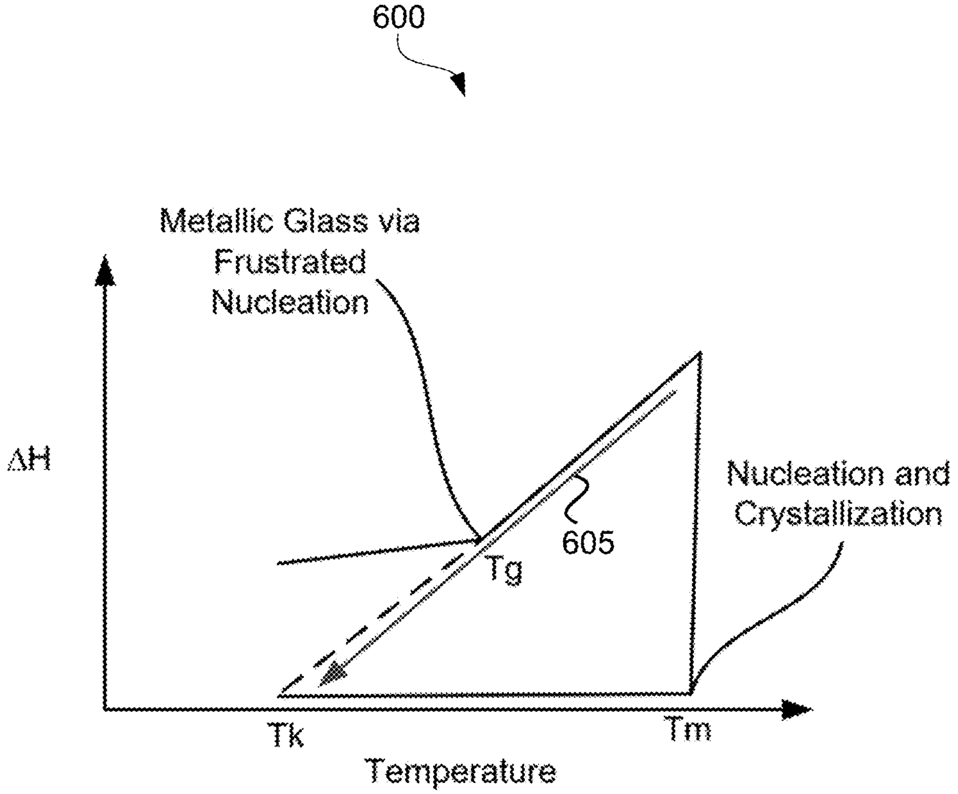
FIG. 6 is a change in enthalpy versus temperature graph showing a glass transition temperature for an supercooled metal that can be used within a supercooled micro-capsule, according to embodiments of the disclosure.

FIG. 6 illustrates a change in enthalpy vs temperature graph 600 showing a glass transition temperature for a supercooled metal that can be used within a supercooled and/or amorphous solid micro-capsule, according to embodiments of the disclosure. As shown in FIG. 6, when a supercooled micro-capsule includes an outer shell designed to frustrate nucleation and crystallization of the bulk core, the bulk core can be deeply supercooled and follow path 605 along the chart, yet remain a liquid until the bulk core is cooled to the glass temperature T g where it is in an amorphous solid state that can also called a "glass-state" or a bulk metallic glass (BMG). In some embodiments the deeply cooled bulk may be a polymorphous material with short range order, but lacking crystalline form, as compared to a typical metal structure that has a crystalline structure. In some embodiments, the entirety of the bulk core can be in an amorphous solid state, while in other embodiments, one or more regions of the bulk core can be in an amorphous solid state. The degree of supercooling dictates the properties of the resulting amorphous solid. Tk is the Kauzzmann temperature where the extrapolated liquid entropy meets the crystal entropy. Amorphous solid metals may or may not be included in any of the embodiments described herein. For example, as shown in in FIG. 1B an amorphous solid metal may form all or a portion of metallic core 155 and may be surrounded by one or more shell structures (e.g., 115, 120).

In some embodiments, the supercooled particles remain liquidus below the glass transition temperature (Tg) of the bulk material and may have induced structural organization in the liquid form allowing for low temperature partitionless solidification into a networked amorphous material. By cooling a metallic core of a supercooled liquid micro-capsule along path 805 while frustrating nucleation with an outer shell, at least one region of an amorphous solid metal in the metallic core may form.

As described in more detail herein, in various embodiments amorphous solid micro-capsules can be combined with solid particles such that when the solid particles reach their melting temperature a flux dissolves the shells of the amorphous solid micro-capsules allowing the amorphous solid to rapidly diffuse and mix with the molten solid particles. In some embodiments this diffusion may result in an alloy with a higher melting temperature than the melting temperature of the solid particles so an assembly may be processed at a relatively low temperature yet the joints that are formed may have a relatively high melting temperature.

As described in more detail herein, in some embodiments the amorphous solid micro-capsules can be thermocompressively bonded together to form a larger amorphous solid. In various embodiments solder bumps for electronic packages can be replaced with amorphous solid micro-capsules to create joints at relatively lower temperatures that can enable a faster manufacturing process than traditional soldering operations.

Micro-Capsule Sizes

FIG. 7 illustrates a chart 700 of solder paste type categories with the size ranges of the solder particles expressed in microns. In some embodiments supercooled micro-capsules and/or amorphous solid micro-capsules can be made with various diameters. In some embodiments the micro-capsules may have diameters including any of the ranges expressed in FIG. 10, while in some embodiments the diameter may be less than 2 microns, less than 1 micron, less than 100 nanometers, less than 50 nanometers or less than 10 nanometers. With reduced sized micro-capsules, size-effects may enable deep supercooling and/or formation of amorphous solid cores. While in other embodiments the diameter may be greater than 160 microns, greater than 200 microns, greater than 300 microns, greater than 400 microns or greater than 500 microns. In further embodiments the diameter may be less than 500 microns, less than 200 microns, less than 10 microns, less than 1 micron or less than 500 nm. In various embodiments, relatively large diameter micro-capsules may be used for single solder ball replacements on flip-chips, chip-scale packages, plastic ball grid array packages or other types of electronic packages. These embodiments may enable a soldering operation via fluxless processing such as for example exposure to formic acid/hydrogen environments or may be exposed to compressive forces to fracture the outer shell. More specifically in some embodiments an electronic package may be equipped with a unitary micro-capsule for each interconnect location. In other embodiments two or more micro-capsules may be disposed on a pad of a land grid array and arranged to form a solder joint between the package and corresponding pads on a circuit board.

In some embodiments an outer organic coating that may comprise a ligand may be a dynamic ligand that responds to one or more stimuli (e.g., chemical, light, temperature) where before exposure to the stimuli the ligand is stable and after the stimuli the shell is relatively unstable.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A particle comprising:

a shell comprising an inner metal layer, an outer metal-oxide layer, and an organic coating on an exterior surface of the outer metal-oxide layer; and an amorphous solid metallic core fully enclosed within the shell, the shell configured to prevent or delay transition of the amorphous solid metallic core to a crystalline solid state when the particle is exposed to a temperature above a glass-transition temperature of the amorphous solid metallic core, wherein a diameter of the particle is between 2 and 160 microns.

2. The particle of claim 1, further comprising one or more regions having a crystalline or semi-crystalline structure disposed within the amorphous solid metallic core.

3. The particle of claim 1, wherein the amorphous solid metallic core includes tin, silver and copper.

4. The particle of claim 3, wherein the amorphous solid metallic core further includes at least one additional element.

5. The particle of claim 3, wherein the amorphous solid metallic core further includes at least one of phosphorous, vanadium, silicon or bismuth.

6. The particle of claim 1, wherein the amorphous solid metallic core includes tin and bismuth.

7. The particle of claim 6, wherein the amorphous solid metallic core further includes at least one additional element.

8. The particle of claim 6, wherein the amorphous solid metallic core further includes at least one of phosphorous, vanadium or silicon.

9. A droplet comprising:

a metal alloy core in an amorphous solid state, the droplet having a temperature below a glass-transition temperature of the metal alloy core; and a shell fully enclosing the metal alloy core and including an inner metal layer, an outer metal-oxide layer, and an organic coating on an exterior surface of the outer metal-oxide layer, the shell configured to prevent or delay transition of the metal alloy core to a crystalline solid state when the droplet is exposed to a temperature above the glass-transition temperature, wherein a diameter of the droplet is between 2 and 160 microns.

10. The droplet of claim 9, further comprising one or more regions having a crystalline or semi-crystalline structure disposed within the metal alloy core.

11. The droplet of claim 9, wherein the metal alloy core includes tin, silver and copper.

12. The droplet of claim 11, wherein the metal alloy core further includes at least one of phosphorous, vanadium, silicon or bismuth.

13. The droplet of claim 9, wherein the metal alloy core includes tin and bismuth.

14. The droplet of claim 13, wherein the metal alloy core further includes at least one of phosphorous, vanadium or silicon.

15. A method of making a droplet, the method comprising:

forming a metallic core of the droplet;

forming a shell of the droplet around and fully enclosing the metallic core, the shell comprising an inner metal layer, an outer metal-oxide layer, and an organic coating on an exterior surface of the outer metal-oxide layer; and after forming the shell, transitioning the metallic core to an amorphous solid state to obtain an amorphous solid metallic core, wherein the shell is configured to prevent or delay transition of the amorphous solid metallic core to a crystalline solid state when the droplet is exposed to a temperature above a glass-transition temperature of the amorphous solid metallic core, wherein a diameter of the droplet is between 2 and 160 microns.

16. The method of claim 15 further comprising forming one or more regions within the metallic core that have a crystalline or semi-crystalline structure.

17. The particle of claim 1, wherein the diameter of the particle is between 2 and 80 microns.

18. The particle of claim 1, wherein the organic coating comprises a ligand configured to respond to one or more stimuli such that after exposure to the one or more stimuli the shell becomes less stable.

* * * * *